(12) United States Patent
Parthasarathy et al.

(10) Patent No.: US 8,666,988 B2
(45) Date of Patent: Mar. 4, 2014

(54) CONFIGURING CLASSIFIER TREES AND CLASSIFYING DATA

(75) Inventors: Srinivasan Parthasarathy, Hawthorne, NY (US); Deepak S. Turaga, Hawthorne, NY (US); Olivier Verscheure, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 12/466,101

(22) Filed: May 14, 2009

(65) Prior Publication Data

US 2010/0293207 A1 Nov. 18, 2010

(51) Int. Cl.
*G06F 7/00* (2006.01)
*G06F 17/30* (2006.01)

(52) U.S. Cl.
USPC ............................................ 707/740; 707/748

(58) Field of Classification Search
None
See application file for complete search history.

(56) References Cited

U.S. PATENT DOCUMENTS

| | | | |
|---|---|---|---|
| 7,577,709 B1* | 8/2009 | Kolcz | 709/206 |
| 7,769,228 B2 | 8/2010 | Bahlmann et al. | |
| 2005/0189415 A1 | 9/2005 | Fano et al. | |
| 2006/0112038 A1 | 5/2006 | Luo | |
| 2006/0173559 A1* | 8/2006 | Kirshenbaum et al. | 700/31 |
| 2006/0177099 A1 | 8/2006 | Zhu et al. | |
| 2007/0112701 A1 | 5/2007 | Chellapilla et al. | |
| 2009/0125473 A1 | 5/2009 | Amini et al. | |
| 2010/0310183 A1* | 12/2010 | Kendall et al. | 382/224 |

OTHER PUBLICATIONS

Y. Chi, Philip S. Yu, Haixun Wang, Richard R. Muntz, "Loadstar: A Load Shedding Scheme for Classifying Data Streams," IEEE ICDM, 2004.
Huitao Luo, "Optimization Design of Cascaded Classifiers", Proceedings of the 2005 IEEE Computer Society Conference on Computer Vision and Pattern Recognition (CVPR'05).
Paul Viola, Michael Jones, "Rapid Objection Detection using a Boosted Cascade of Simple Features", IEEE, CVPR, 2001.
Xing et al., "Dynamic Load Distribution in the Borealis Stream Processor", in ICDE, 2005, pp. 791-802.
Cherniack et al., "Scalable Distributed Stream Processing", Proceedings of the 2003 CIDR Conference, Jan. 2003.
Balazinska et al, "Fault-Tolerance in the Borealis Distributed System Processing System", in SIGMOD, Jun. 14-16, 2005, Baltimore, Maryland, USA, pp. 13-24.

(Continued)

*Primary Examiner* — Rehana Perveen
*Assistant Examiner* — Raheem Hoffler
(74) *Attorney, Agent, or Firm* — F. Chau & Associates, LLC; William J. Stock (57) ABSTRACT

According to an exemplary embodiment of the present invention, a method to configure a network of classifiers includes configuring a plurality of classifiers in a network of classifiers, such that the configuring associates a plurality of operating points with each output branch, associating a different quality profile with each output point for each output branch in the plurality of classifiers, and storing the configured network of classifiers and quality profile associations in the computer system to be used for classifying future input data according to the network configuration and quality profile association. Each classifier comprises executable code that classifies the data. Each of said classifiers has a plurality of the output branches that each output the data to another classifier. Each operating point comprises a probability of determining that a data item input to the classifier has a particular characteristic and a probability that said determination falsely detected the characteristic.

25 Claims, 11 Drawing Sheets

(56) References Cited

OTHER PUBLICATIONS

Tatbul et al., "Staying FIT: Efficient Load Shedding Techniques for Distributed Stream Processing", in Proceedings of the 33rd International Conference on Very Large Databases (VLDB), 2007.
Viglas et al., "Rate-Based Query Optimization for Streaming Information Sources", ACM SIGMOD, Jun. 4-6, 2002, Madison, Wisconsin, USA.
Eide et al., "Supporting Timeliness and Accuracy in Distributed Real-time Content-based Video Analysis", in ACM International Conference on Multimedia, Nov. 2-8, 2003, Berkley, California, USA.
Chi et al., "Loadstar: Load Shedding in Data Stream Mining", Proceedings of the 31st VLDB Conference, Trondheim, Norway 2005.
Motwani et al, "Query Processing, Resource Management, and Approximation in a Data Stream Management System", Proceedings of the 2003 CIDR Conference.
Babcock et al., "Operator Scheduling in Data Stream Systems", The VLDB Journal, 2004.
Carney et al., "Monitoring Streams—A New Class of Data Management Applications", Proceedings of the 28th VLDB Conference, Hong Kong, China, 2002.
Teng et al., "Resource-Aware Mining with Variable Granularities in Data Streams", in ICDM 2004, 2004.
Gaber et al., "Resource-aware Knowledge Discovery in Data Streams", in International Workshop on Knowledge Discovery in Data Streams, 2004.
Foo et al., "Configuring Trees of Classifiers in Distributed Multimedia Stream Mining Systems", IEEE Transactions on Circuits and Systems for Video Technology, vol. 21, No. 3, Mar. 2011.
Naphade et al., "On the Detection of Semantic Concepts of Trecvid", Proceedings of the 12th Annual ACM International Conference on Multimedia, New York, NY, USA, 2004 pp. 660-667.
Snoek et al., "Multimodal Video Indexing: A Review of the State-of-the-art", Multimedia Tools Application, vol. 25, No. 1, pp. 5-35, 2005.
Naphade et al., "Large-Scale Concept Ontology for Multimedia", IEEE MultiMedia, vol. 13, No. 3, pp. 86-91, 2006.
Yi Wu et al., "Ontology-based Multi-Classificatoin Learning for Video Concept Detection", IEEE International Conference on Multimedia and Expo (ICME), Taipei, Taiwan, 2004.
Vailaya et al., "A Bayesian Framework for Semantic Classification of Outdoor Vacation Images", SPIE Conference on Electronic Imaging, San Jose, California, 1999.
Yan et al., "A review of text and image retrieval approaches for broadcast news video", Inf.Retr., vol. 10, No. 4-5, pp. 445-484.
Fangwen Fu, Deepak S. Turaga, Olivier Verscheure, Mihaela vander Schaar, Lisa Amini, "Configuring Competing Classifier Chains in Distributed Stream Mining Systems", submitted to IEEE JSTSP, vol. 1, No. 4, pp. 548-563, Dec. 2007.
Brian Babcock, Shivnath Babu, Mayur Datar, Rajeev Motwani, "Chain: Operator Scheduling for Memory Minimization in Data Stream Systems", ACM SIGMOD, 2003, Jun. 9-12, 2003, San Diego, CA.
Nesime Tatbul, Ugur Cetintemel, Stan Zdonik, Mitch Cherniack, Michael Stonebraker, "Load Shedding in a Data Stream Manager," Proceedings of the 29th VLDB Conference, Berlin, Germany, 2003.
Chris Olston, Jing Jiang, Jennifer Widom, "Adaptive Filters for Continuous Queries over Distributed Data Streams", ACM SIGMOD 2003, pp. 563-574, Jun. 2003.
Jean Duong, Hubert Emptoz, "Cascade Classifier: Design and Application to Digit Recognition", Proceedings fo the 2005 8th International Conference on Document Analysis and Recognition (ICDAR '05).
Lorenzo Bruzzone, Robert Cossu, "A Multiple-Cascade-Classifier System for a Robust and Partially Unsupervised Updating of Land-Cover Maps", IEEE Transactions on Geoscience and Remote Sensing, vol. 40, No. 9, Sep. 2002.
Ankur Jain, Edward Y. Chang, Yuan-Fang Wang, "Adaptive Stream Resource Management Using Kalman Filters", SIGMOD 2004, Jun. 13-18, 2004, Paris, France.
Paul T. Boggs, Jon W. Tolle, "Sequential Quadratic Programming", ACTA Nummerica (1996), pp. 1-52.
Mehul A. Shah, et al., "Flux: An Adaptive Partitioning Operator for Continuous Query Systems", in ICDE, Mar. 2003, pp. 25-36.
R. Lienhart, et al., "A Detector Tree of Boosted Classifiers for Real-Time Object Detection and Tracking", in ICME, 2003.
A. Ntoulas, et al., "Detecting Spam Web Pages through Content Analysis", in WWW, May 2006, Edinburgh, Scotland, pp. 83-92.

\* cited by examiner

CONFIGURING CLASSIFIER TREES AND CLASSIFYING DATA

This invention was made with United States Government support under Contract No. H98230-07-C-0383, awarded by the Department of Defense. The United States Government has certain rights in this invention.

BACKGROUND OF THE INVENTION

1. Technical Field

The present disclosure relates generally to cascaded classifier/filter based topologies, and more specifically to methods for configuring cascaded classifier/filter based topologies and classifying data.

2. Discussion of Related Art

Real-time processing, mining, and classification of continuous, high volume data streams is increasingly important for many applications including financial analysis, real-time manufacturing process control, search engines, spam filters, medical services, etc. Distributed stream mining systems have been recently developed to support such stream processing applications. Applications may be decomposed into flowgraphs or topologies of distributed processing operators that are deployed on a set of resource constrained nodes to meet scalability, reliability, and performance objectives of large-scale, real-time stream mining.

Stream classification and mining applications implement topologies of low-complexity binary classifiers to accomplish the task of complex classification. Such classifiers may be implemented as software executing on one or more computer processors to perform the intended classification function. Classifiers label data objects by grouping them into one or more classes based on certain measured features. When the properties of a data object have a hierarchical structure, rather than making use of a single complex classifier, it can be more efficient to construct a cascade or tree of low complexity binary classifiers. However, managing such complex topologies of operators under dynamically changing resources and data characteristics to maximize application relevant performance can be challenging.

Conventional approaches in stream mining use load-shedding to deal with large data volumes or limited system resources. While naïve load shedding may perform well for simple data management jobs, such as aggregation, they generally do not perform well on jobs involving sophisticated data classification. Intelligent and Quality of Service (QoS) driven measures based on predicted feature values have been developed. However, the performance of such local load-shedding can be highly suboptimal in terms of end-to-end performance, as data discarded at one stage may be needed for a later (downstream) stage.

Figure 1:
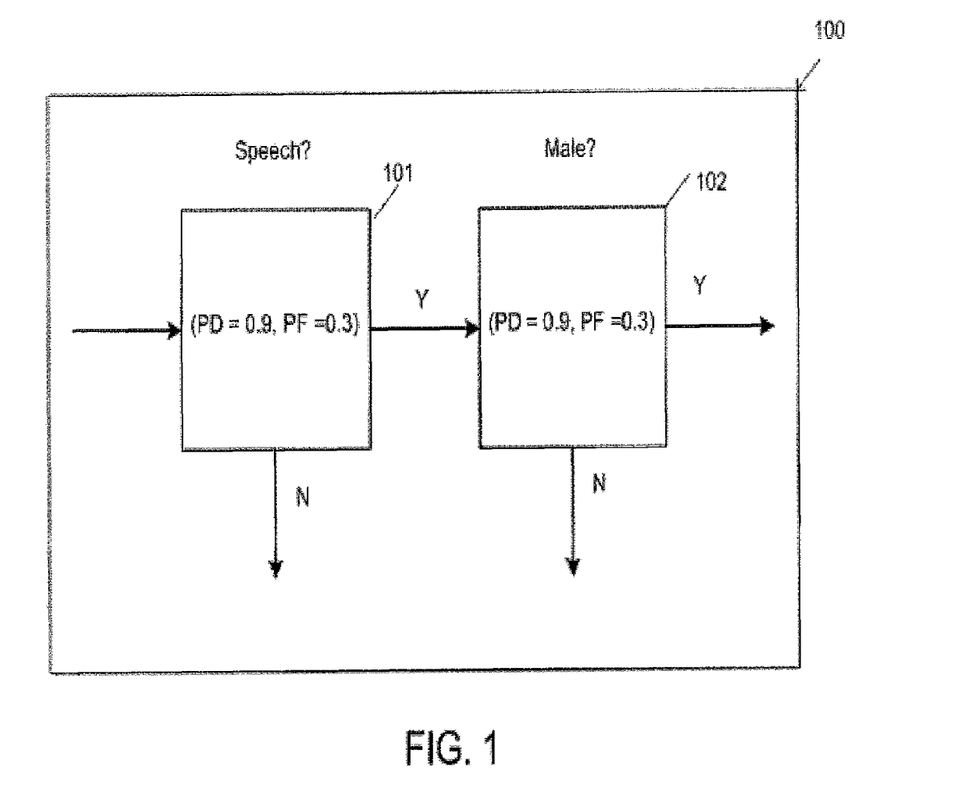
FIG. 1 illustrates an example of a cascade of classifiers, where each classifier has a single operating point.

In one approach, each of the classifiers includes a single operating point, which corresponds to a single probability of correct detection $P_D$ and a single probability of false detection $P_F$. For example, FIG. 1 illustrates a cascade of classifiers for classifying speech, where each of the classifiers 101 and 102 have a single operating point (e.g., $\{P_D=0.9, P_F=0.3\}$). The classifiers 101 and 102 include a single outgoing "yes" output branch and a single outgoing "no" output branch. For example, data classified correctly or incorrectly (e.g., a false alarm) as being speech by the classifier 101 is output along the "yes" output branch and the rest of the data is output along the "no" edge. However, a single operating point per classifier may not be able to partition data to satisfy resource constraints when the resource constraints are tight or the load is heavy.

Figure 2:
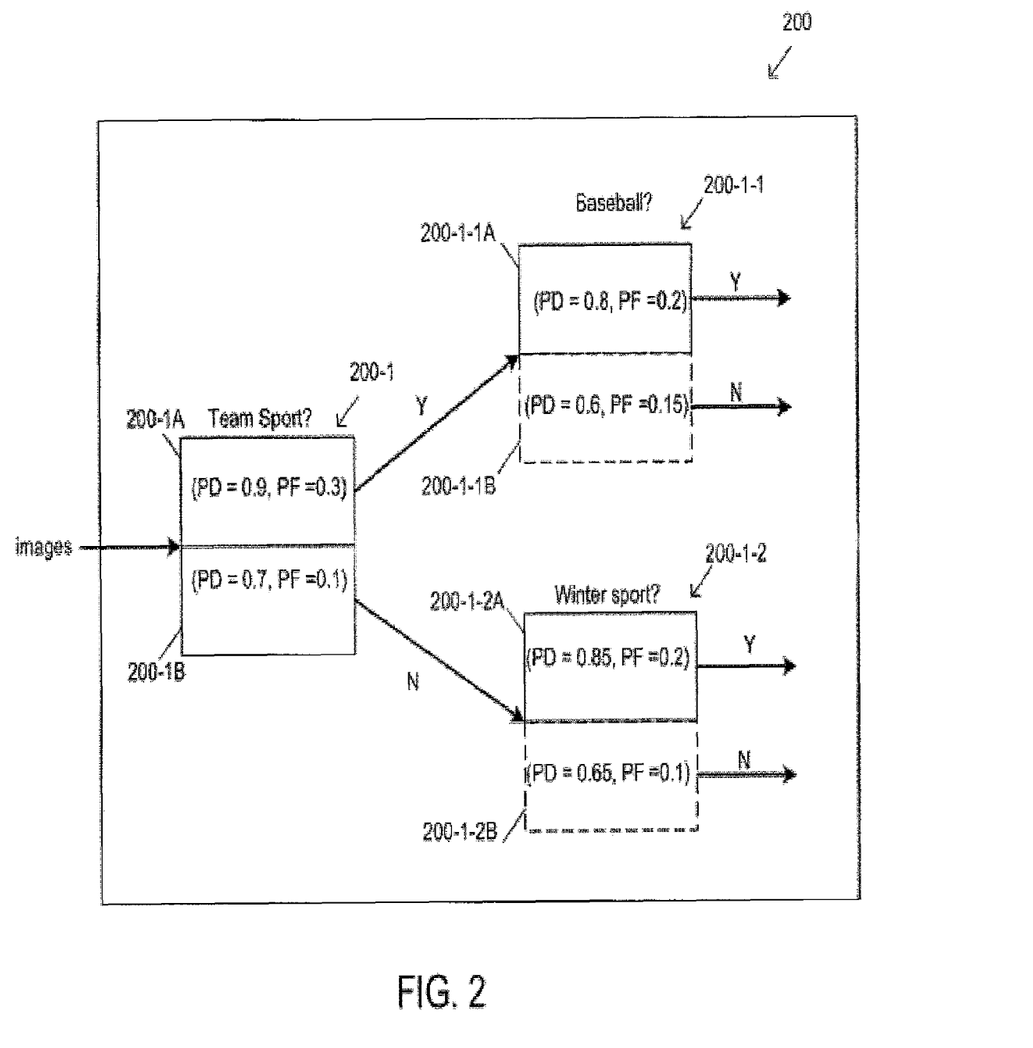
FIG. 2 illustrates an example of a network of classifiers configured such that each classifier has a single operating point for each output branch.

A classifier of another approach employs a single operating point for each output branch. For example, FIG. 2 illustrates a classifier tree 200 for classifying sports images, which has been configured to employ a single operating point for each output branch. The classifier tree 200 includes a parent classifier 200-1, a first child classifier 200-1-1 and a second child classifier 200-1-2. The parent classifier 200-1 receives images and classifies whether the received images represent a team sport (e.g., football, baseball, etc.). Each of the classifiers 200-1, 200-1-1, and 200-1-2 includes two operating points, one for each "yes" output branch and one for each "no" output branch. For example, the parent classifier 200-1 includes a positive classifying portion 200-1A having a first operating point of ($P_D=0.9$, $P_F=0.3$) and negative classifying portion 200-1B having a second operating point of ($P_D=0.7$, $P_F=0.1$), the first child classifier 200-1-1 includes a positive classifying portion 200-1-1A having a first operating point of ($P_D=0.8$, $P_F=0.2$) and a negative classifying portion 200-1-1B having a second operating point of ($P_D=0.6$, $P_F=0.15$), and the second child classifier 200-1-2 includes a positive classifying portion 200-1-2A having a first operating point of ($P_D=0.85$, $P_F=0.2$) and a negative classifying portion 200-1-2B having a second operating point of ($P_D=0.65$, $P_F=0.1$). However, from the prospective of optimization and performance analysis, this approach may lead to a non-convexity in a utility surface. Further, one cannot guarantee convergence of this approach to a global optimum or guarantee the quality of its solution. Further, the approach may be suboptimal in resource-constrained processing environments.

Thus, there is a need for improved methods of configuring classifier networks.

BRIEF SUMMARY

According to an exemplary embodiment of the present invention, a method to configure a network of classifiers includes configuring a plurality of classifiers in a network of classifiers, such that the configuring associates a plurality of operating points with each output branch, associating a different quality profile with each output point for each output branch in the plurality of classifiers, and storing the configured network of classifiers and quality profile associations in the computer system to be used for classifying future input data according to the network configuration and quality profile association. Each classifier comprises executable code that classifies the data. Each of said classifiers has a plurality of the output branches that each output the data to another classifier. Each operating point comprises a probability of determining that a data item input to the classifier has a particular characteristic and a probability that said determination falsely detected the characteristic. The quality profile associated with the operating point used by the classifier to classify a particular data item is output from the classifier to a next classifier along with the data item.

According to an exemplary embodiment of the present invention, a method to route data through a network of classifiers includes: configuring, by a computer system, each classifier of a network of classifiers to include a plurality of operating points for each output branch of the classifier, associating, in the computer system, a different quality profile to data output along each output branch and classified according to a respective one of the operating points, for each output branch of each classifier in the network, determining a subset of the operating points for the classifier in the computer system, and for each quality profile of the subset output to a respective classifier in the network, routing, by the computer system, data associated with the quality profile to at least one operating point of the respective classifier in the network. Each operating point includes a probability of detecting a characteristic of the data and a probability of falsely detecting the characteristic.

According to an exemplary embodiment of the present invention a system to perform distributed classification of data includes a plurality of computing nodes networked together. At least one of the computing nodes configures each classifier of a network of classifiers to include a plurality of operating points for each output branch, associates a different quality profile to data output along each output branch and classified according to each operating point, and assigns a part of the network to a respective one of the computing nodes. The computing nodes classify input data in a distributed manner according to the assigned parts. At least one of the computing nodes determines a subset of the operating points for a parent classifier of the network and routes data between a quality profile of the subset output by the parent classifier and at least one operating point of a child classifier of the network.

An exemplary embodiment of the present invention includes a method to classify data including: configuring, by a computer system, each classifier of a network of classifiers to include a plurality of operating points for each output branch of the classifier, associating, by the computer system, a different quality profile to data output along each output branch and classified according to a respective one of the operating points, assigning, by the computer system, each part of the network to a respective one of a plurality of computing nodes, determining, by the computer system, a subset of the operating points, routing, by the computer system, data between each quality profile of the subset and at least one of the determined operating points of a classifier of the network, and classifying, by the computer system, the routed data by executing the assigned parts on the corresponding computing nodes.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more computer readable medium (i.e., program storage devices such as a hard disk, magnetic floppy disk, RAM, ROM, CD ROM, etc., and executable by any device or machine comprising suitable architecture, such as a general purpose digital computer having a processor, memory, and input/output interfaces). It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

At least one embodiment of the present invention incorporates multiple operating points simultaneously per output branch of each classifier, which allows the classifier to operate at different tradeoffs between false alarms and detection dynamically based on the underlying resources or data characteristics. Equivalently, this may be viewed as having multiple virtual classification trees, all instantiated in parallel, each with one operating point per output branch of each classifier. Optimization then involves not just selecting the appropriate operating points, but also routing the data to be classified end-to-end across these multiple virtual trees.

In at least one embodiment of the present invention, the set of available operating points for each classifier in a network is constrained to a fixed number and classified data is partitioned into multiple discrete quality profiles. A fixed number of operating points corresponds to a discretization of a detection-error tradeoff (DET) curve, which characterizes classifier performance that plots the probability of detection $P_D$ against the probability of false alarm $P_F$. A classified data sample belongs to a particular quality profile if the confidence of its classification lies in an interval between boundaries of the profile. For example, a quality interval of 0-1 could be partitioned into 10 uniform profiles, and then a data sample that is classified with confidence 0.82 would belong to profile 0.8-0.9. The partitioning of the quality profiles combined with the discretization of the DET curves may prevent exponential growth of a search space and ensure that constraints and objective functions are linear.

In an embodiment, the detection of semantic concepts may be inferred in a video stream from low-level image/video features via supervised learning algorithms. These low-level features can be extracted from different visual descriptors, such as a color histogram, color correlogram, color moments, co-occurrence texture, wavelet texture, edge histogram, etc. Individual classifiers may be built per concept on each low-level feature and any associated data annotations. For example, classifiers may be built on Support Vector Machines (SVMs).

Figure 3:
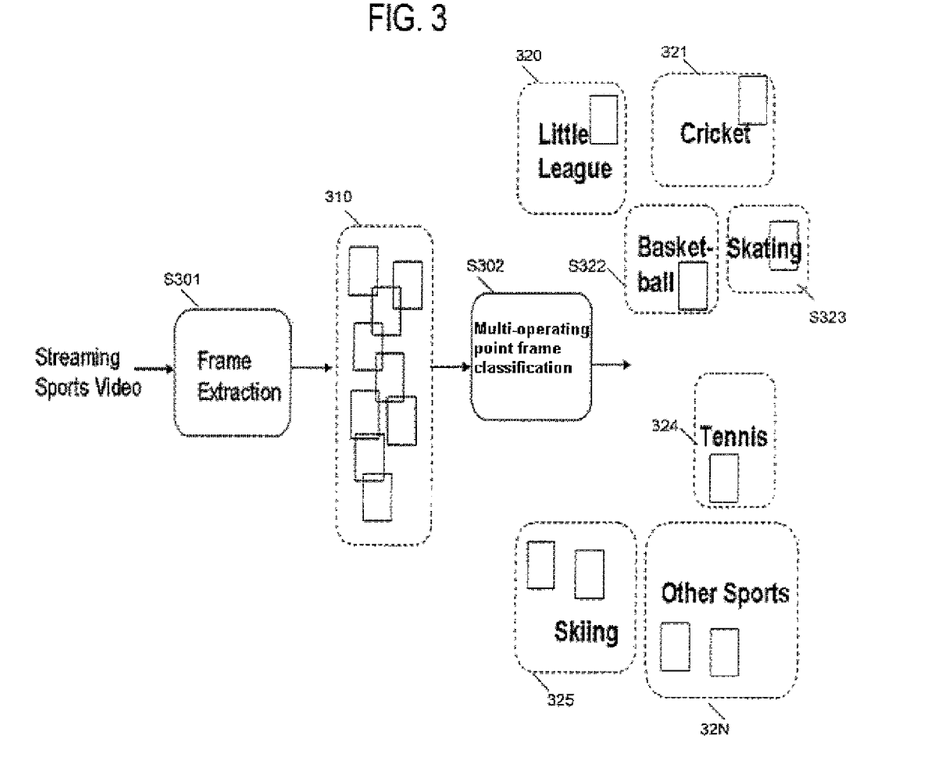
FIG. 3 illustrates a multimedia stream mining application, which may be used to analyze images of sports scenes in real time, according to an exemplary embodiment of the present invention.

In contrast to detecting individual concepts in isolation, semantic concepts can be organized into hierarchical ontologies (e.g., networks, trees, etc.), where the connection between each pair of concepts is constructed based on their semantic relationship. Organizing concepts into a tree topology with hyponym and hypernym relationships between a parent and a child pair can result in a higher detection performance as compared to baseline approaches. For example, top-level parents often include a sufficient number of general training examples for classification, while low-level children may be more specific in terms of distinguishing local differences. Further, a tree topology provides a flexible and efficient solution for detecting semantic concepts. FIG. 3 illustrates a multimedia stream mining application, which may be used to analyze images of sports scenes in real time according to an exemplary embodiment of the present invention. The stream mining application can detect different semantic concepts (e.g., little league concept 320, cricket concept 321, basketball concept 322, skating concept 323, tennis concept 324, skiing concept 325, . . . , other sports concepts 32N) from an image stream (e.g., a streaming sports video) using a tree of classifiers configured according to an exemplary embodiment of the present invention. The application may perform frame extraction on the image stream to generate a plurality of image frames 310 (S301) and then use the tree of classifiers to perform multi-operating point frame classification to classify the frames into the different semantic concepts 320-32N (S302). In embodiments, S302 includes a plurality of classifiers (e.g., each having a plurality of operating points), each of which may be a software application executing on one or more processors to perform a classification function.

Figure 4:
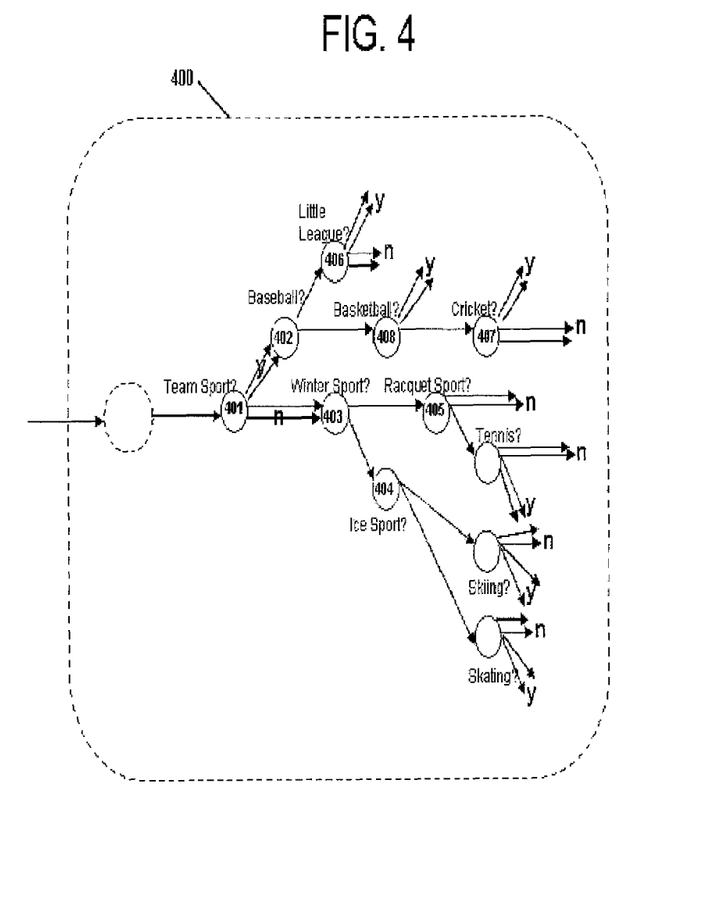
FIG. 4 illustrates a tree of classifiers, which may be used by the multimedia mining application of FIG. 3 to classify the sports images, according to an exemplary embodiment of the present invention.

FIG. 4 illustrates a tree 400 of classifiers, which may be used by the multimedia mining application of FIG. 3 to classify the sports images. The tree 400 introduces additional intermediate concept detectors (e.g., team-sports classifier 401, baseball classifier 402, winter-sports classifier 403, ice-sports classifier 404, and racquet-sports classifier 405), such that not all classifiers need to process all images. For example, the team-sports classifier 401 may be used to filter data relevant to a little-league classifier 406, a cricket classifier 407, and a basketball classifier 408. The mutually exclusive nature of some of the classifiers, such as the team-sports classifier 401, the winter-sports classifier 403, and the racquet-sports classifier 405 allows further optimization in terms of identifying data having these characteristics in series (e.g., only pass data along to a next classifier if it satisfies the previous classifier). Using the constructed hierarchy, the amount of data that each classifier needs to process may be significantly lower than the total data volume, depending on the a-priori probability of concept occurrence, which may lead to a savings in resource consumption. Further, such a topology may be deployed on a set of distributed nodes using a stream mining middleware such as an INFOSPHERE STREAMS stream processing system, commercially available from International Business Machines Corporation of Armonk, N.Y.

The tree of classifiers 400 may be operated within an application in a computer system on a large-scale collection of images (e.g., upwards of 20,000 sports images downloaded from the internet). The images may be streamed at a periodic rate (e.g., 1 image/second) to the system. Each classifier may be implemented as support vector machine (SVM) learned from other sports images. In one embodiment of the present invention, the classifiers use image features, such as a color histogram and a Gabor texture.

Each of the classifiers may be viewed as comprising two decision making units, namely, a positive classification unit and a negative classification unit. For each input stream item, the positive classifier unit of a classifier decides if the item belongs to its class and the negative classification unit decides if the item does not belong to its class. Decoupling positive and negative classification in such a manner provides for more flexible load shedding and replication policies to improve the overall system performance. Positively classified data items are forwarded to a fixed child of the operator in the tree, while items that are negatively classified are forwarded to another child (e.g., assuming such a child is present in the tree).

Figure 5:
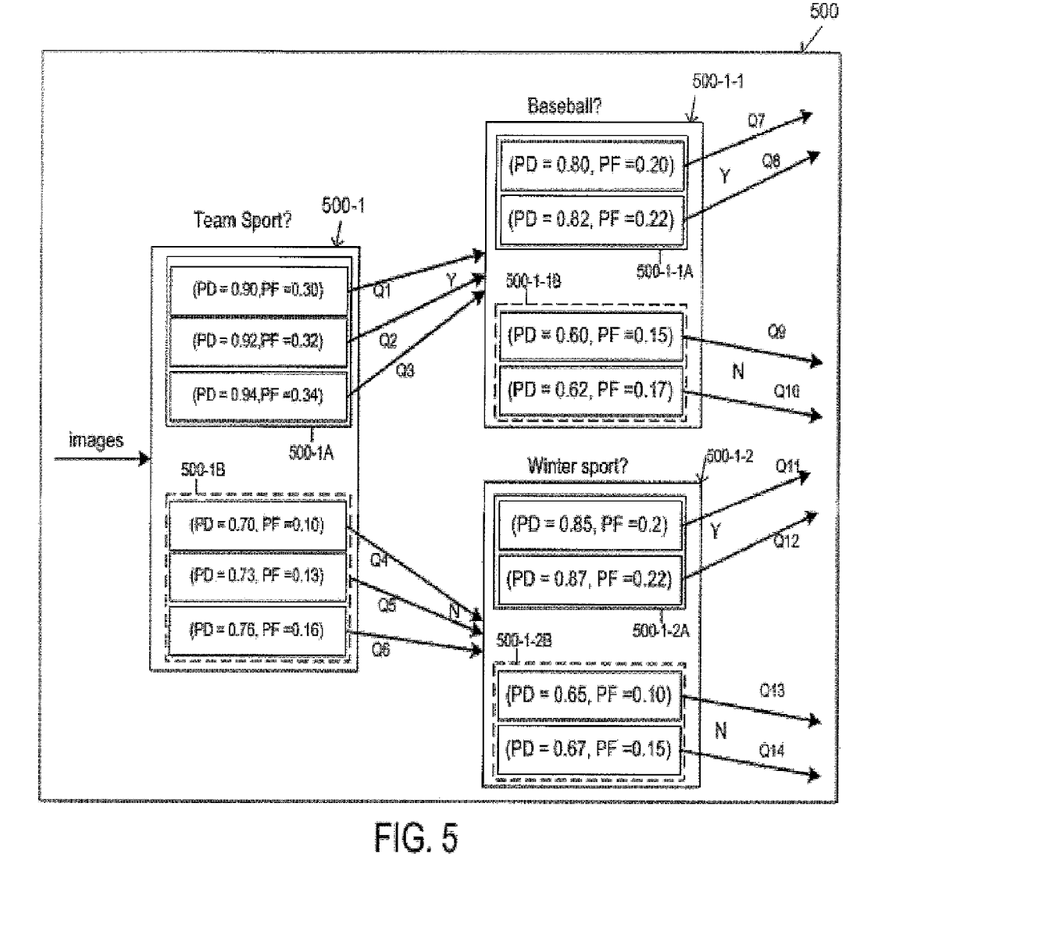
FIG. 5 illustrates a classifier of the classifier tree of FIG. 4, according to an exemplary embodiment of the present invention.

FIG. 5 illustrates a classifier part 500 of the classifier tree 400 of FIG. 4. Here, each classifier of the classifier part 500 has been configured to have multiple operating points, multiple decision making units (e.g., a positive and a negative), and output classified data according to multiple qualities, according to an exemplary embodiment of the present invention. Referring to FIG. 5, the classifier part 500 includes a parent classifier 500-1 for classifying whether a data item is a team sport, a first child classifier 500-1-1 for classifying whether an item classified as a team sport data item is baseball, and a second child classifier 500-1-2 for classifying whether an data item classified as not being a team sport is a winter-sport.

Each of the classifiers 500-1, 500-1-1, and 500-1-2 include positive and negative decision making units. For example, the team-sport classifier 500-1 includes a positive-team-sport decision making unit 500-1A and a negative-team-sport decision making unit 500-1B, the baseball classifier 500-1-1 includes a positive-baseball decision making unit 500-1-1A and negative-baseball decision making unit 500-1-1B, and the winter-sport classifier 500-1-2 includes a positive-winter-sport decision making unit 500-1-2A and negative-winter-sport decision making unit 500-1-2B.

Each of the positive and negative decision making units include multiple operating points. Data classified according to each of these different operating points is output with a corresponding quality level Q1-Q14. FIG. 5 shows three operating points being used for each of the positive and negative decision making units of the parent classifier 500-1, two operating points being used for each of the positive and negative decision making units of the children classifiers 500-1-1 and 500-1-2, and 14 overall quality levels. However, this is a merely an example, as each of the units may have a variable number of operating points, which in turn results in a varying number of overall quality levels.

For example, if an image received by the classifier part 500 is classified as being a team sport by the parent classifier 500-1 using the first operating point (e.g., $\{P_D=0.9, P_F=0.3\}$), the image is output along the "Y" output branch having a quality level of Q1 to the first child classifier 500-1-1. If the output image is then classified as not being baseball by the first child classifier 500-1-1 using the fourth operating point (e.g., $\{P_D=0.62, P_F=0.17\}$), the image is then output along the "N" output branch having a quality level of Q9.

Real-world classification is often approximate and classification results can include both false positives (i.e., the instance does not belong to the class, but the classifier tagged it positively) as well as false negatives (i.e., the instance does belong to the class, but the classifier tagged it negatively). The performance of each of the classifiers may be characterized by a DET curve, which parameterizes the probability of a true positive result of the classifier (e.g., its probability of detection, $P_D$ value), which can be achieved for a given probability of a false positive result (e.g., its probability of false alarm, $P_F$ value).

Each classification unit $C^i$ (e.g., 500-1, 500-1-1, and 500-1-2) may be associated with a penalty function (or cost), which is a function of its classification error. The parameter $r^i$ may be used to denote the rate at which stream items enter the classification unit $C^i$. The parameter $\phi^i$ may be used to denote the average fraction of items in the stream which are true positives for this unit. The parameter $\phi^i$ is a characteristic of the input stream rather than that of the classification unit $C^i$. When a classification unit $C^i$ is operating at the point $<P_D, P_F>$, the rate at which false positive and negative results are produced by the classification unit $C^i$ may be respectively represented by Equations 1 and 2 as follows:

$$R_{FP} = r^i \cdot (1-\phi^i) \cdot P_F \quad \text{(EQUATION 1)}$$

$$R_{FN} = r^i \cdot \phi^i \cdot (1-P_D) \quad \text{(EQUATION 2)}.$$

The cost incurred by classification unit $C^i$ may be represented by Equation 3 as follows:

$$KC^i = \lambda_F^i r^i (1-\phi^i) P_F + \lambda_M^i r^i \phi^i (1-P_D) \quad \text{(EQUATION 3)}$$

where $\lambda_F^i$ and $\lambda_M^i$ are fixed, non-negative constants specific to the classification unit $C^i$.

Each classification unit $C^i$ (or a classification operator) may be deployed in a parallel, resource constrained environment. For example, in one embodiment of the present invention, each classification operator could be placed on its own dedicated processor (e.g., there is a one to one mapping between operators and processors). However, this is merely an example, as multiple copies of a single operator may be present on multiple processors. Processing capability for the $i^{th}$ operator may be specified by $u^i$, which is a positive constant that is an upper bound on the maximum rate at which stream items can enter operator i. The rate at which stream items arrive at operator $C^i$ is a function of the ingress rate of the operator that lies at the root of the classification tree, data characteristics of the stream items (e.g., those that specify the true probability of a data item belonging to a particular class), and the operating points of the upstream classification operators. The ingress rate can be assumed to be a fixed value $R_i$, which is less than the capacity of the root classifier. The total cost of the classification tree is the sum of costs of the individual classification units.

At least one embodiment of the present invention attempts to determine the operating point of each classification unit such that, the total input rate of the streams at each classification operator does not exceed its capacity, and the total cost of classification is minimized. Classifiers of a parameterized classification tree have their own operating points fixed at specific values. The space of parameterized classification trees consist of an unbounded number of such trees corresponding to all possible operating point combinations. For example, selection of each of the first operating points in classifiers 500-1, 500-1-1, and 500-1-2 in FIG. 5 would represent one possible operating point combination of the classification part 500. The space of parameterized classification trees may be reduced to a finite set by quantizing the operating points of classifiers and permitting only the combinations of these quantized values in classification trees. The ingress stream then needs to be split across these finite number of quantized classification trees to minimize cost while respecting the capacity constraints of the processors that each classifier is run on.

At least one embodiment of the present invention introduces quantized profiles, which aggregate the input and output streams of classifiers into various bins depending on their correctness and quality. In this way, the classifiers can be viewed as routing agents, which ingest input stream data items from a collection of quantized input profiles, and produce output streams, which correspond to various output profiles. For example, referring to FIG. 5, images can be routed through the second operating point of classifier 500-1 to produce output stream Q2. The output stream Q2 can be considered a quantized input profile. The quantized input profile Q2 can then be routed, for example, to the first operating point of classifier 500-1-1 to produce output stream Q7.

For example, the $P_D$ value of a quantized classification unit can be restricted to discrete values within the interval [0, 1]. For example, in one embodiment of the present invention, each of the classifiers includes at least two operating points (e.g., L≥2). For example, these points could correspond to $P_D$ values in the set $$\left\{0, \frac{1}{L-1}, \frac{2}{L-1}, \ldots, 1\right\}.$$

This yields a finite collection of quantized classification trees, each of which is parameterized by a set of operating point (e.g., one set for each classifier). One can determine an optimum or near-optimum subset of these quantized classifications trees, and the rate at which stream items should be routed through each of these quantized classification trees, such the total costs of classification is minimized.

The quality factor of a stream, which is output from (or input) to a classifier, characterizes the correctness of the stream. For example, for an output stream of a classifier that operates at some fixed operating point, classification errors can introduce several data items into this output stream, which truly should not belong to this stream. The quality factor of the output stream may be defined as the ratio of the number of items in the stream which truly belong to it, to the total number of items in the stream. The classifier can be viewed as transforming an input stream with a given quality factor into an output stream with another quality factor (e.g., the output quality factor depends on the input quality factor and the operating point of the classifier.

The quality factor of an input stream may be denoted $l^i$ (e.g., only an $l^i$ fraction of the input to classifier $C^i$ truly belong to the parent class of $C^i$). Thus, a $l^i \cdot \phi^i$ fraction of the input stream may be classified positively by $C^i$, ideally resulting in an output rate of $r \cdot l^i \cdot \phi^i$. However, due to classification errors, the rate of correct items in the output stream is only $r^i \cdot l^i \cdot \phi^i \cdot P_D$ and the total rate of the output stream may be represented by Equation 4 as follows:

$$T = r^i \cdot l^i \cdot \phi^i \cdot P_D + r^i (1 - l^i \phi^i) P_F \quad \text{(EQUATION 4)},$$

which generates a quality factor Q that may be represented by Equation 5 as follows:

$$Q = \frac{r^i l^i \phi^i P_D}{r^i l^i \phi^i P_D + r^i (1 - l^i \phi^i) P_F}. \quad \text{(EQUATION 5)}$$

The quality factor Q is dependent only on the input quality factor and the operating point, but not on the input rate itself.

The quality factor of the ingress stream which enters the root operator may be assumed to be 1. The quantized root operator has a choice of L operating points, and a fraction of the ingress stream is routed to each of these operating points. The classifier can be viewed as consisting of L outputs, each corresponding to a fixed output quality factor, and the rate of each of the output streams being decided by the assignment of the input rate across the various operating points of the classifier. For example, consider the first child classifier 500-1-1 of FIG. 5. This classifier can be viewed as having L input streams, each with a distinct input quality factor, and resulting in $L^2$ distinct output streams with distinct output quality factors. The rate of each of these output streams may be determined by the flow assignment.

The classifier at the $j^{th}$ level of the tree (e.g., classifier part 500, assuming a root level=1) consumes $L^{j-1}$ input streams, has L operating points and produces $L^j$ output streams, with each stream corresponding to a specific quality factor. Optimization requires deciding how the flow of an input stream is split across the operating points of the classifier it enters. This decision is made subject to the capacity constraints at each classifier (e.g., a linear condition on the rates), with the objective of minimizing the total cost (e.g., a linear function of the rates). The number of possible quality factors is still exponential, which would create an exponentially sized linear optimization problem.

Figure 6:
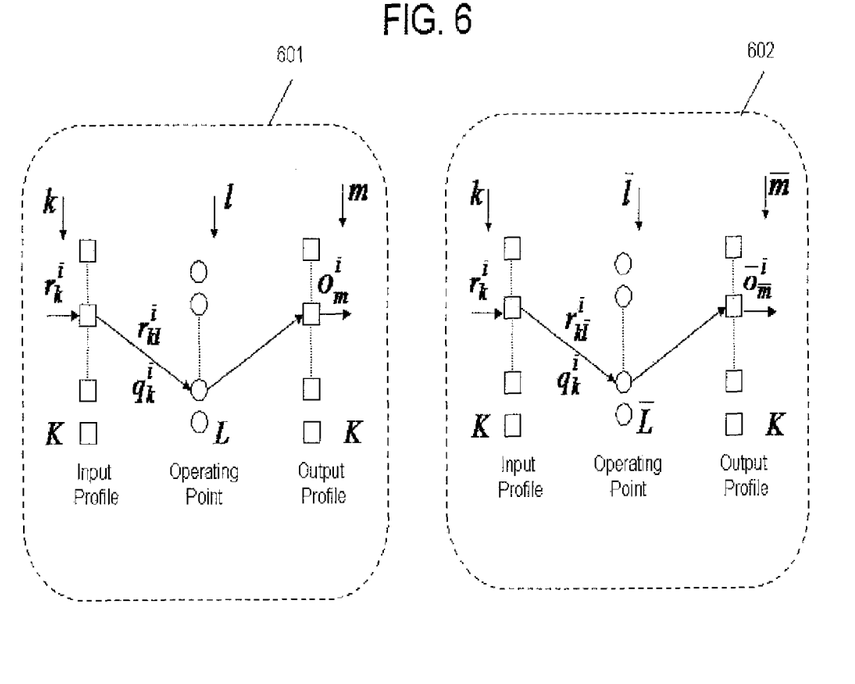
FIG. 6 illustrates use of quantized profiles in conjunction with a quantized classifier, according to an exemplary embodiment of the present invention.

However, quantized stream profiles may be introduced to reduce the complexity of the linear optimization problem. FIG. 6 illustrates use of quantized profiles in conjunction with a quantized classifier, according to an exemplary embodiment of the present invention. The classifier of FIG. 6 may be viewed as a routing agent, which while operating at a fixed operating point, ingests an input stream from a specific input profile and transmutes it into a scaled output stream of an appropriate output profile. The classifier includes a positive classification unit 601 and a negative classification unit 602.

Instead of dealing with an exponential number of quality factors, the range [0,1] of possible quality factors can be quantized into K discrete values and each quality factor can be approximated into one of these K discrete values, for each unit 601 and 602. For example, at least two quantized profiles (e.g., K≥2) may be present with quality factors $$0, \frac{1}{K-1}, \frac{2}{K-1}, \dots, 1,$$

respectively. If each unit 601 and 602 produces an output stream whose quality factor lies in the range $$\left[\frac{j}{K-1}, \frac{j+1}{K-1}\right],$$

then this stream may be rounded up and treated as belonging to the $j+1^{st}$ quantized profile. Thus, for each quantized classifier, L operating points, K quantized input profiles, and K quantized output profiles are present. An input quality factor in combination with an operating point determines the quality factor. This fact, in combination with the above described round-up rule, maps each K×L ordered pairs of input profiles and classifier operating points into an output profile. A linear optimization problem including a count of 2KLN decision variables (e.g., ignoring the fact that the root classifier has only one input profile with a non-zero rate) may be formulated to determine the optimum or near-optimum routing of input profiles across operating points of the classification units they enter, where N is the total number of nodes in the classification tree. The linear optimization problem includes 2KL rate variables corresponding to each classification operator, since there are K input and output profiles for each classification unit, L operating points, and two units (e.g., a positive and a negative) per classification operator.

In alternative embodiments of the present invention, in a classification tree of quantized classifiers with quantized profiles, the quantized input profiles may be replicated or shed as necessary, depending on the availability of resources. For example, when extra resources are available, quantized input profiles may be replicated, and when resources are limited, less meaningful quantized input profiles may be shed (e.g. discarded).

Figure 7:
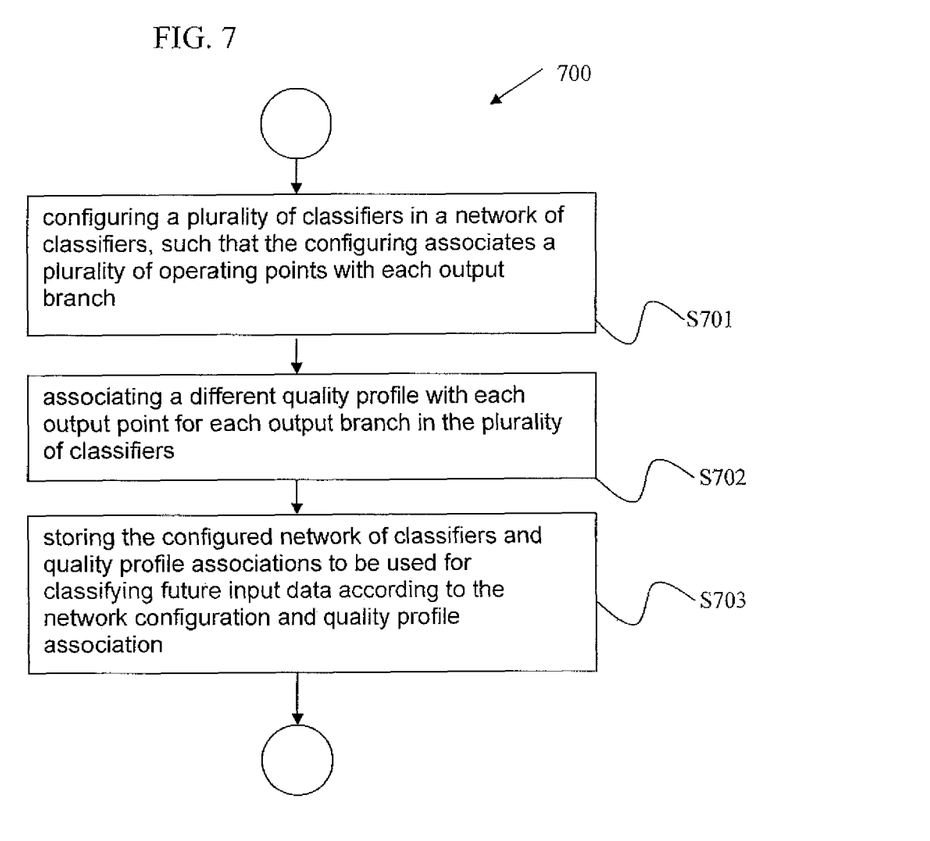
FIG. 7 illustrates a method to configure a network of classifiers, according to an exemplary embodiment of the present invention.

FIG. 7 illustrates a method (700) to configure a network of classifiers, according to an exemplary embodiment of the present invention. The method (700) includes: configuring a plurality of classifiers in a network of classifiers, such that the configuring associates a plurality of operating points with each output branch (S701), associating a different quality profile with each output point for each output branch in the plurality of classifiers (S702), and storing the configured network of classifiers and quality profile associations to be used for classifying future input data according to the network configuration and quality profile association (S703). Each classifier comprises executable code that classifies the data. Each of the classifiers has a plurality of the output branches that each output the data to another classifier. Each operating point comprises a probability of determining that a data item input to the classifier has a particular characteristic and a probability that said determination falsely detected the characteristic. The quality profile associated with the operating point used by the classifier to classify a particular data item is output from the classifier to a next classifier along with the data item. The method may be executed by a configuration application on a computer system.

Figure 8:
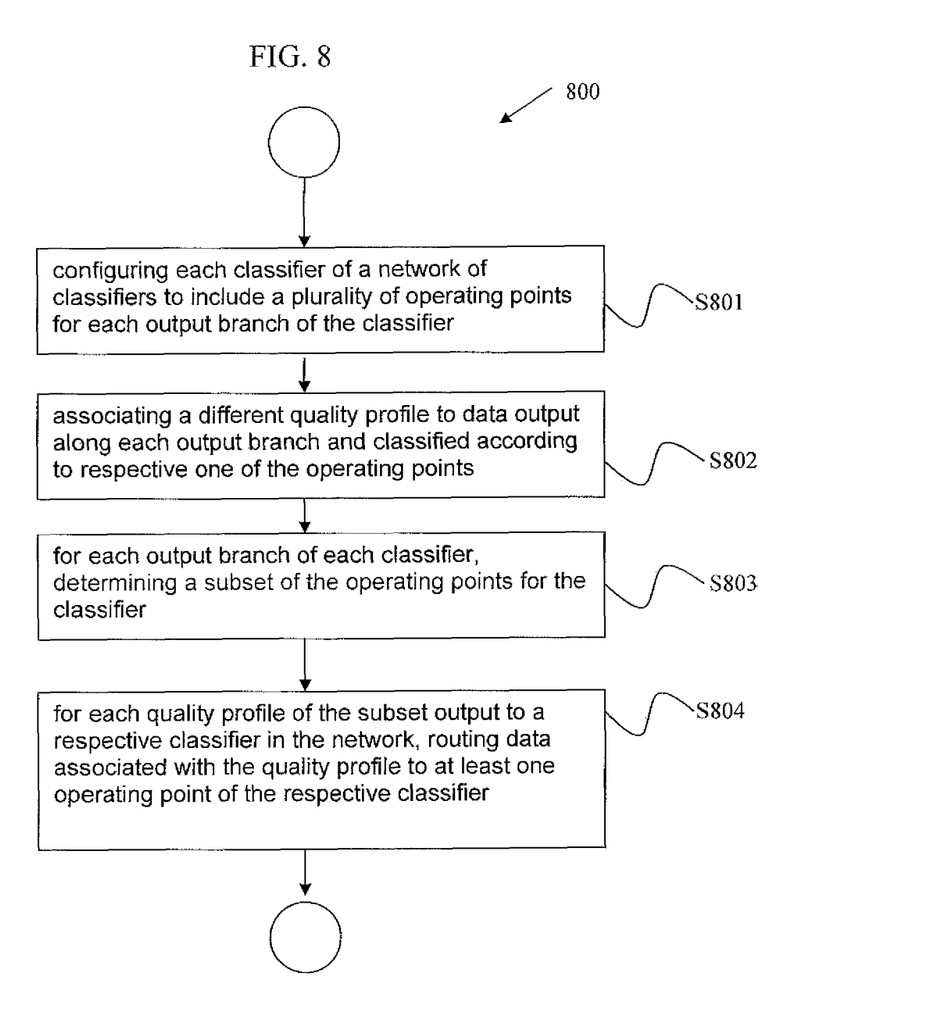
FIG. 8 illustrates a method to route data through a network of classifiers, according to an exemplary embodiment of the present invention.

FIG. 8 illustrates a method (800) to route data through a network of classifiers, according to an exemplary embodiment of the present invention. The method (800) includes: configuring each classifier of a network of classifiers to include a plurality of operating points for each output branch of the classifier (S801), associating a different quality profile to data output along each output branch and classified according to a respective one of the operating points (S802), for each output branch of each classifier in the network, determining a subset of the operating points for the classifier (S803), and for each quality profile of the subset output to a respective classifier in the network, routing data associated with the quality profile to at least one operating point of the respective classifier (S804). The determining of the subset and the routing may be performed based on current resources of a computer system in which the classifier is intended to be run.

Figure 9:
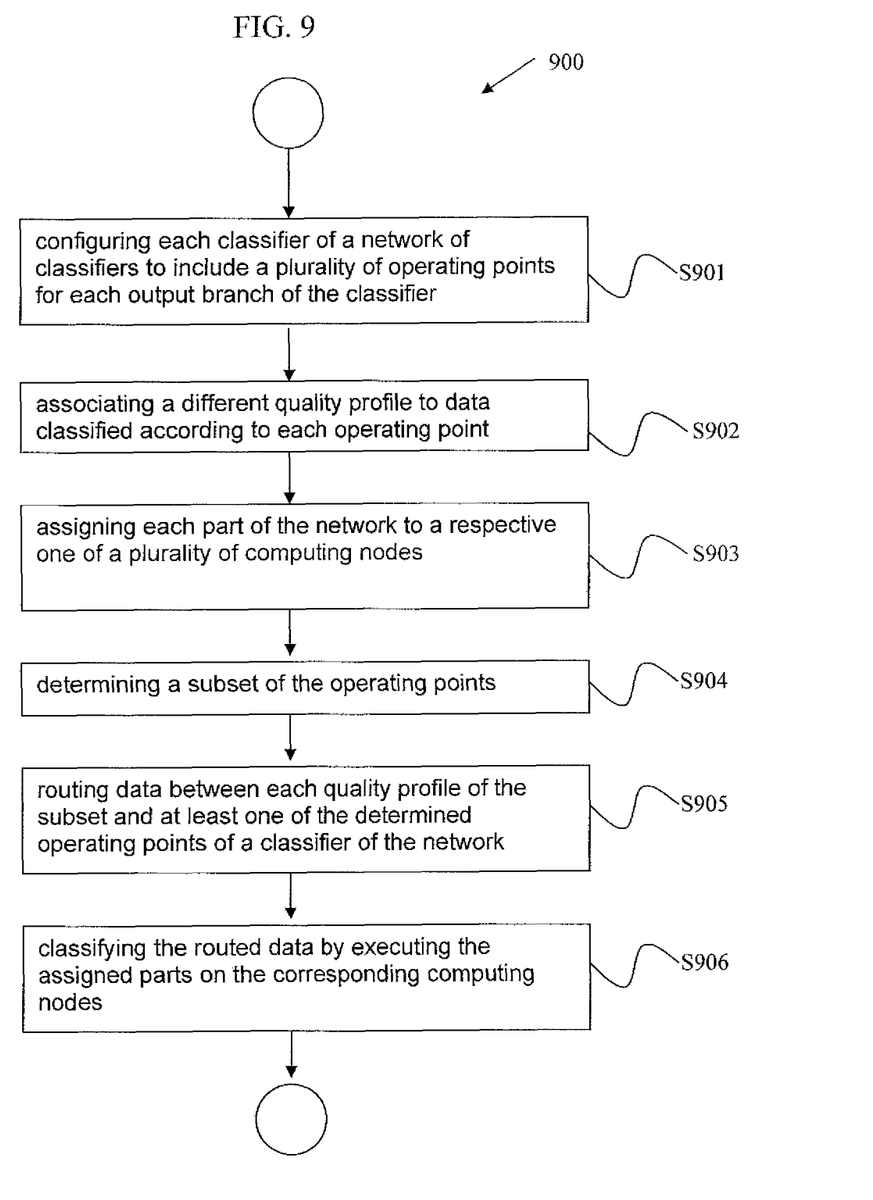
FIG. 9 illustrates a method to classify data, according to an exemplary embodiment of the present invention.

FIG. 9 illustrates a method (900) to classify data, according to an exemplary embodiment of the present invention. The method (900) includes configuring each classifier of a network of classifiers to include a plurality of operating points for each output branch of the classifier (S901), associating a different quality profile to data classified according to each operating point (S902), assigning each part of the network to a respective one of a plurality of computing nodes (S903), determining a subset of the operating points (S904), routing data between each quality profile of the subset and at least one of the determined operating points of a classifier of the network (S905), and classifying the routed data by executing the assigned parts on the corresponding computing nodes (S906). The determining and the routing may be performed based on the resource constraints of the computing nodes.

Figure 10A:
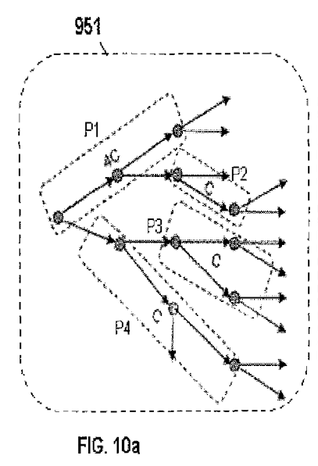
FIG. 10A and FIG. 10B illustrate high level system organizations of classifier trees that use quantized classifiers and quantized profiles according exemplary embodiments of the present invention.
Figure 10B:
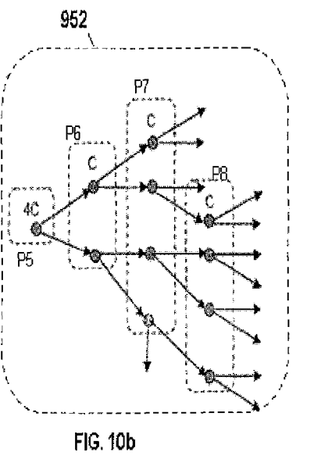

FIG. 10A and FIG. 10B illustrate different high level system organizations of classifier trees that use quantized classifiers and quantized profiles, according to exemplary embodiments of the present invention. Each of the systems includes a plurality of computing nodes (e.g., processors or workstations) N1-N4 and N5-N8, respectively. FIG. 10A illustrates a system 951 that attempts to minimize cross-talk between nodes N1-N4 (e.g., traffic across the network) by placing chains of classifiers on the same computing node. FIG. 10B illustrates a system 952 that uses a fault tolerant hierarchical deployment, where the most important (upstream) classifiers are placed on the most reliable nodes. In this example, each system 951 and 952 includes three machines (P2-P4 and P6-P8) with identical processors, with an equivalent speed of C cycles/sec, and a single machine with 4 such processors (P1 and P5), with an equivalent speed of 4C cycles/sec.

Figure 11:
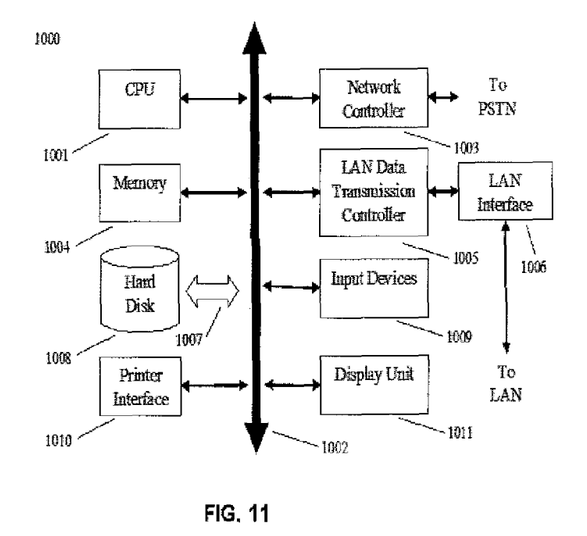
FIG. 11 shows an example of a computer system capable of implementing the methods and systems according to embodiments of the present invention.

FIG. 11 illustrates an example of a computer system which may implement methods of the present disclosure. The methods of the present disclosure may be implemented in the form of a software application running on a computer system, for example, a mainframe, personal computer (PC), handheld computer, server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007. CPU 1001 may be the computer processor that performs the steps of the methods described above with reference to FIG. 7, FIG. 8, and FIG. 9.

Classifier networks that may be configured by embodiments of the present invention or data that may be routed or classified according to the configured classifier networks may be output from the computer systems, for example through LAN interface 1006, through printer interface 1010, or on display unit 1011, and may be used to perform classification of data.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. A method to configure a network of classifiers, wherein each classifier comprises executable code that classifies data, the method comprising:
configuring, by a configuration application executing on a computer system, a network of classifiers, wherein a first classifier of the network has at least two output branches to output data classified as having a particular characteristic to another second classifier of the network,
wherein the configuring associates a different operating point with each output branch, wherein each operating point comprises a probability pair comprising a first probability for determining that a data item output to the second classifier has the particular characteristic and a second probability that said determination falsely detected the characteristic, wherein the probability pairs of each operating point differ from one another;
associating, by the configuration application, a different quality profile with each operating point, wherein each quality profile indicates that data classified according to the corresponding operating point has a different level of confidence; and
storing the configured network of classifiers and quality profile associations in the computer system.

2. The method of claim 1, wherein the configuring of the classifiers is performed based on current resources of the computer system.

3. The method of claim 1, wherein costs are associated with each of the probabilities and the associating of the quality profiles is further based on minimizing the costs.

4. The method of claim 1, wherein the network is a tree.

5. The method of claim 1, wherein the configuring further comprises configuring the first classifier to include at least two other output branches to output data classified as excluding the characteristic.

6. An apparatus comprising a non-transitory computer readable medium embodying instructions executable by a processor to route data through a network of classifiers, the method steps comprising instructions for:
configuring a first classifier of a network of classifiers to include at least two output branches for classifying data as having a particular characteristic, wherein each output branch has a different operating point;
associating a different quality profile with each operating point to indicate a different level of confidence in classifying data according to the corresponding operating point;
selecting a subset of the operating points; and
for each quality profile of the subset, routing data classified with the quality profile to a second other classifier of the network,
wherein each operating point includes a probability pair comprising a first probability for detecting that the data has the characteristic and a second probability for falsely detecting that the data has the characteristic, and the probability pairs for each operating point differ from one another.

7. The apparatus of claim 6, wherein the determining of the subset and the routing is performed based on current resources of a computer system.

8. The apparatus of claim 7, wherein costs are associated with each of the probabilities and the determining of the subset and routing is further based on minimizing the costs.

9. The apparatus of claim 6, wherein the network is a tree.

10. The apparatus of claim 6, wherein the the second classifier receives the routed data along with the quality profile of the corresponding operating point that was used to classify the data.

11. The apparatus of claim 6, further comprising configuring the first classifier to include at least two other output branches for classifying data as excluding the characteristic.

12. A system to perform distributed classification of data, wherein the system comprises:
a local area network LAN;
a plurality of computing nodes networked together across the LAN, wherein each computing node is a computer system comprising a central processing unit CPU, a memory, and a network interface configured to enable the computing node to access the LAN,
wherein the memory of at least one of the computing nodes comprises a first computer program that when executed by the corresponding CPU, configures a first classifier of a network of classifiers to have at least two output branches to classify data as having a particular characteristic, each branch associated with a different operating point, associates a different quality profile to each operating point, and assigns a part of the network of classifiers to a respective one of the computing nodes, wherein the computing nodes classify input data in a distributed manner according to the assigned parts, and wherein the memory of at least one of the computing nodes comprises a second computer program that when executed by the corresponding CPU, determines a subset of the operating points for the first classifier and routes data classified according to the quality profiles of the subset to a second other classifier of the network of classifiers, wherein each operating point of the first classifier includes a probability pair that includes a first probability for detecting the data has a characteristic and a second probability for falsely detecting that the data has the characteristic, and the probability pairs for each operating point differ from one another.

13. The system of claim 12, wherein the determining of the subset and the routing is performed based on current resources of each computing node.

14. The system of claim 12, wherein the parts of the network are assigned by placing at least one complete chain of classifiers of the network classifiers on a same computing node.

15. The system of claim 12, wherein the network is a tree.

16. The system of claim 15, wherein a subset of the parts between a predefined level of the tree and a root of the tree are assigned to the computing nodes having a reliability rating above a predefined threshold value.

17. The system of claim 12, wherein costs are associated with each of the probabilities and the determining of the subset and routing is further based on minimizing the costs.

18. The system of claim 12, wherein the second classifier receives the routed data along with the quality profile of the corresponding operating point that was used to classify the data.

19. The system of claim 12, wherein the memory of at least one of the computing nodes comprises a third computer program that when executed by the corresponding CPU, configures the first classifier to have at least two other output branches to classify data as excluding the characteristic.

20. A method to classify data, the method comprising:

configuring, by a computer system, a first classifier of a network of classifiers to include at least two output branches to output data classified as having a particular characteristic to another second classifier of the network, each output branch associated with a different operating point;

associating, by the computer system, a different quality profile to data output along each output branch and classified according to a respective one of the operating points;

assigning, by the computer system, each part of the network to a respective one of a plurality of computing nodes in the computer system;

determining, by the computer system, a subset of the operating points;

routing, by the computer system, data associated with each quality profile of the subset to the second classifier; and classifying the routed data by executing the assigned parts on the corresponding computing nodes, wherein each operating point includes a probability pair that includes a first probability for detecting that the data has the characteristic and a second probability for falsely detecting that the data has the characteristic, and the probability pairs of each operating point differ from one another.

21. The method of claim 20, wherein the determining and the routing is performed based on resource constraints of the computing nodes.

22. The method of claim 20, wherein the assigning comprises placing at least one complete chain of classifiers of the network on a same computing node.

23. The method of claim 20, wherein the network is a tree and the assigning comprises placing a subset of the parts between a predefined level of the tree and a root of the tree on the computing nodes having a reliability rating above a predefined threshold value.

24. The method of claim 20, wherein the determining and routing is further based on minimizing costs associated with each of the probabilities.

25. The method of claim 20, wherein the second classifier receives the routed data along with the quality profile of the corresponding operating point that was used to classify the data.

* * * * *